(12) United States Patent
Andon et al.

(10) Patent No.: US 10,994,188 B2
(45) Date of Patent: May 4, 2021

(54) SHIN GUARD WITH REMOTE HAPTIC FEEDBACK

(71) Applicant: NIKE, Inc., Beaverton, OR (US)

(72) Inventors: Christopher Andon, Portland, OR (US); Antonio Pulido Vizcaino, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 225 days.

(21) Appl. No.: 15/778,352

(22) PCT Filed: Nov. 30, 2016

(86) PCT No.: PCT/US2016/064265
§ 371 (c)(1),
(2) Date: May 23, 2018

(87) PCT Pub. No.: WO2017/095956
PCT Pub. Date: Jun. 8, 2017

(65) Prior Publication Data
US 2018/0345117 A1 Dec. 6, 2018

Related U.S. Application Data

(60) Provisional application No. 62/261,149, filed on Nov. 30, 2015.

(51) Int. Cl.
*A63B 71/12* (2006.01)
*G06F 3/01* (2006.01)
(Continued)

(52) U.S. Cl.
CPC .......... *A63B 71/12* (2013.01); *A63B 71/0619* (2013.01); *A63B 71/1225* (2013.01);
(Continued)

(58) Field of Classification Search
None
See application file for complete search history.

(56) References Cited

U.S. PATENT DOCUMENTS 7,771,293 B1 * 8/2010 Vann .................. A63B 69/0071
473/422
8,902,159 B1 * 12/2014 Matthews ............... G06F 3/016
345/156

(Continued)

FOREIGN PATENT DOCUMENTS

| KR | 1020100032273 A | 3/2010 |
|---|---|---|
| KR | 101337821 B1 | 12/2013 |
| WO | WO-2017095956 A1 | 6/2017 |

OTHER PUBLICATIONS

"International Application Serial No. PCT/US2016/064265, International Search Report dated Mar. 16, 2017", 3 pgs.

(Continued)

*Primary Examiner* — Curtis J King
(74) *Attorney, Agent, or Firm* — Schwegman Lundberg & Woessner, P.A.

(57) ABSTRACT

A shin guard, system, and method includes a rigid member forming an outer surface of the shin guard, one or more soft members, secured with respect to the rigid member, forming an inner surface of the shin guard, and haptic devices positioned with respect to one or both of the rigid member and the one or more soft members. The haptic devices are configured to selectively generate haptic signals according to a plurality of predetermined patterns that may be sensed by a wearer of the shin guard.

8 Claims, 8 Drawing Sheets

(51) Int. Cl.
*A63B 71/06* (2006.01)
*G06F 3/0482* (2013.01)

(52) U.S. Cl.
CPC .............. *G06F 3/011* (2013.01); *G06F 3/016* (2013.01); *A63B 2071/0655* (2013.01); *A63B 2071/1258* (2013.01); *A63B 2225/50* (2013.01); *G06F 3/0482* (2013.01)

(56) References Cited

U.S. PATENT DOCUMENTS

| | | | | |
|---|---|---|---|---|
| 9,254,430 | B2* | 2/2016 | LaSala | G09B 19/0038 |
| 9,384,645 | B1* | 7/2016 | Allen | G08B 21/0461 |
| 9,460,604 | B1* | 10/2016 | Daniel | G03B 27/54 |
| 9,622,521 | B1* | 4/2017 | Clayton | A63B 71/10 |
| 2006/0206977 | A1* | 9/2006 | Hammons | F16F 3/093 |
| | | | | 2/16 |
| 2009/0042674 | A1* | 2/2009 | Shelton | A63B 69/0071 |
| | | | | 473/450 |
| 2010/0328051 | A1* | 12/2010 | Hale | G09B 21/003 |
| | | | | 340/407.1 |
| 2011/0034253 | A1* | 2/2011 | Roll | A61H 1/02 |
| | | | | 463/47 |
| 2011/0183783 | A1* | 7/2011 | Rahim | A63B 71/0622 |
| | | | | 473/422 |
| 2012/0212340 | A1 | 8/2012 | Kruse et al. | |
| 2013/0041590 | A1* | 2/2013 | Burich | G06F 19/3418 |
| | | | | 702/19 |
| 2013/0171599 | A1* | 7/2013 | Bleich | A61B 5/0456 |
| | | | | 434/247 |
| 2013/0178960 | A1* | 7/2013 | Sheehan | G06F 19/3481 |
| | | | | 700/91 |
| 2013/0296741 | A1* | 11/2013 | Wiggin | A61F 5/0127 |
| | | | | 600/595 |
| 2014/0218184 | A1 | 8/2014 | Grant et al. | |
| 2015/0099991 | A1* | 4/2015 | Yamaguchi | A61B 5/7282 |
| | | | | 600/508 |
| 2015/0157917 | A1* | 6/2015 | Gennario, Jr. | A63B 24/0062 |
| | | | | 700/91 |
| 2015/0173666 | A1 | 6/2015 | Smith et al. | |
| 2016/0184703 | A1* | 6/2016 | Brav | A63F 13/5378 |
| | | | | 463/30 |
| 2016/0259410 | A1* | 9/2016 | Moore | G06K 9/00617 |
| 2016/0335876 | A1* | 11/2016 | Verma | G08B 13/1427 |
| 2017/0055880 | A1* | 3/2017 | Agrawal | A61B 5/7405 |
| 2017/0134560 | A1* | 5/2017 | Barnes | H04M 1/72552 |
| 2017/0154505 | A1* | 6/2017 | Kim | G08B 6/00 |
| 2017/0224214 | A1* | 8/2017 | Saigh | A61B 5/6801 |
| 2018/0207480 | A1* | 7/2018 | Hong | A61B 5/0261 |
| 2019/0054347 | A1* | 2/2019 | Saigh | A61B 5/02055 |

OTHER PUBLICATIONS

"International Application Serial No. PCT/US2016/064265, Written Opinion dated Mar. 16, 2017", 5 pgs.

"International Application Serial No. PCT US2016 064265, International Preliminary Report on Patentability dated Jun. 14, 2018", 7 pgs.

* cited by examiner

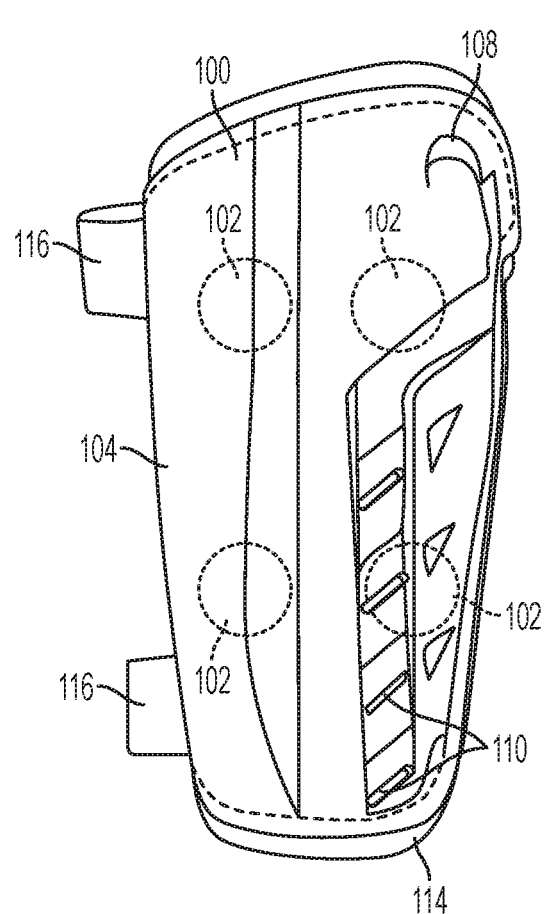
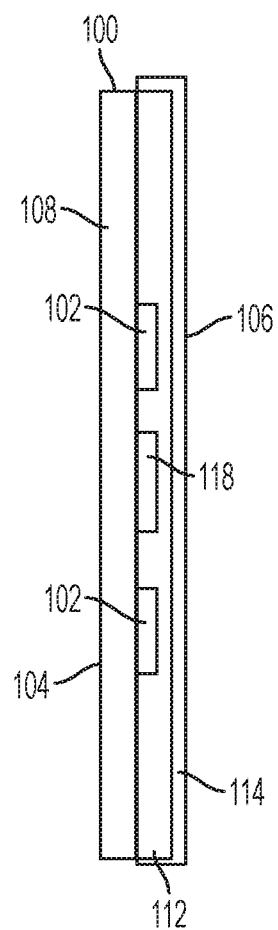
FIG. 1A  FIG. 1B
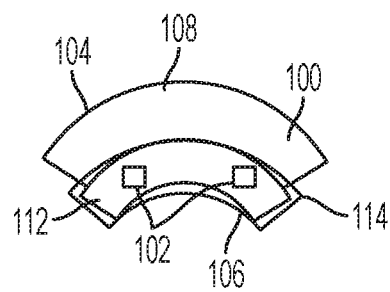
FIG. 1C

SHIN GUARD WITH REMOTE HAPTIC FEEDBACK

CLAIM OF PRIORITY

This application is a U.S. National Stage Filing under 35 U.S.C. 371 from International Patent Application Serial No. PCT/US2016/064265, filed Nov. 30, 2016, published on Jun. 8, 2017 as WO 2017/095956 A1, which application claims the benefit of priority of U.S. Provisional Patent Application Ser. No. 62/261,149, filed on Nov. 30, 2015, the contents of both which are incorporated by reference herein in their entireties.

TECHNICAL FIELD

The subject matter disclosed herein generally relates to a shin guard with remote haptic feedback.

BACKGROUND

Shin guards and other protective devices (herein collectively "shin guards") are conventionally passive gear that protect an area of the body by deflecting, absorbing, and/or redistributing imparted forces. Protective members of the shin guard include rigid members, such as plates of various hard materials, and soft members, such as foam padding. Shin guards are conventionally, though not exclusively, utilized in team sport environments, such as football, baseball, hockey, and the like, in which multiple members of opposing teams vie against one another, often under the direction of non-playing coaches or managers.

BRIEF DESCRIPTION OF THE DRAWINGS

Some embodiments are illustrated by way of example and not limitation in the figures of the accompanying drawings.

FIGS. 1A-1C are perspective, cutaway views of a, front, side, and top, respectively, of a shin guard having haptic devices, in an example embodiment.

DETAILED DESCRIPTION

Figure 2:
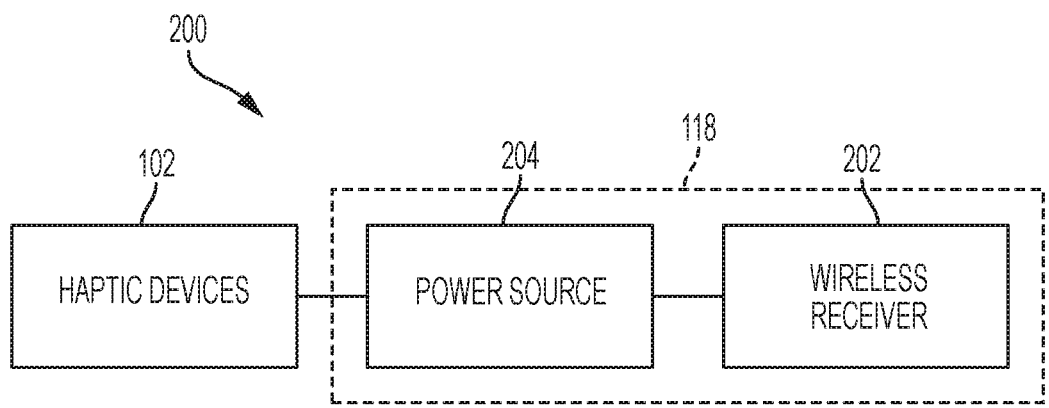
FIG. 2 is a block diagram of electronic components of a shin guard example embodiment.

Example methods and systems are directed to a shin guard with remote haptic feedback. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In contact sports such as international football/soccer or baseball, the shin guards may often be one of the few or the only pieces of protective gear worn by the players. Additionally, even when other protective gear is worn, the shin guard may be one of the few or the only pieces of protective gear that are designed to be in close contact with the wearer's person, whether in direct contact with the skin or through relatively thin apparel, such as a sock. The shin guard may, as a result, provide both mechanical protection against impact while maintaining a tactile interface with the wearer, and may commonly be found in circumstances where the wearers are acting as a team based, at last in part, on remote direction from a coach or manager who is not actively involved with the game or match.

A shin guard has been developed that includes haptic devices embedded within the protective members of the shin guard and coupled to a wireless receiver. The haptic devices are configured and positioned to provide haptic stimulation to the wearer based on a command related to a positon of or action by the wearer on a field of play. The command may be transmitted by coach or manager and the haptic feedback may vary between or within a shin guard so as to convey instructions to the player that may prompt the player to shift their position or action, among other changes. Additionally or alternatively, the shin guard may incorporate electronics that provide automatic haptic feedback based on a determined position of the wearer relative to an established zone, boundary, or position of another player. Thus, the shin guard may move from being a passive protection unit to being a mechanism for communication or feedback that is also protected, at least in part, against impact and damage in contact sports.

FIGS. 1A-1C are perspective, cutaway views of a front, side, and top, respectively, of a shin guard 100 having haptic devices 102, in an example embodiment. The shin guard includes an outer surface 104 and an inner surface 106, the inner surface configured to contact the skin of the wearer or contact the wearer indirectly through a sock or other article of apparel. The shin guard 100 includes a rigid member 108 made, for instance, of hard plastic or polymeric material or other materials designed and/or selected to be resilient to kinetic impacts in the normal course of playing team sports. The rigid member 108 includes or forms apertures 110 to allow for air circulation, though it is to be understood that the rigid member in various embodiments does not include apertures 110 or other openings.

Soft members 11 (collectively with the rigid member 108 the "protective members"), such as foam padding, gel pack, air bag, or other material or system designed to deform in an impact and absorb and/or redistribute imparted kinetic energy, are secured with respect to the rigid member 108, variously by being coupled to the rigid member 108 or by being secured to another component which is itself secured to the rigid member 108. A fabric layer 114 may optionally surround some or all of the protective members 108, 112 for the comfort of the wearer, protection of the protective members 108, 112 from sweat, moisture, or other environmental conditions, and/or for decorative embellishment. Straps 116 are attached to one or more of the protective members 108, 112 and are configured to wrap around a lower leg of the wearer of the shin guard 100 to secure the shin The haptic devices 102 each include one or more haptic motors or other devices, such as electroactive polymers, that can be utilized to provide a haptic stimulation or haptic signal that can be sensed by the wearer of the shin guard 100. Additionally or alternatively, the haptic devices 102 may provide an electrical, heat, or other stimulation instead of or in addition to the haptic stimulation. The haptic devices 102 are distributed at discrete locations with sufficient separation to allow a wearer to discern a different haptic response from different haptic devices 102. In various examples, the haptic devices 102 are separated from one another by approximately five (5) to ten (10) centimeters, though alternative distances may be implemented as appropriate.

As illustrated, the haptic devices are embedded in the soft members 112 and covered by the fabric layer 114. However, it is to be recognized and understood that the haptic devices 102 may be positioned anywhere on the shin guard 100 such that the wearer may sense the haptic stimulation provided by a given haptic device 102. Thus, the haptic device 102 may be positioned or oriented to be in direct contact with the wearer's skin or may be positioned such that the haptic stimulation is discernable to the wearer through the soft member 112.

The shin guard 100 further includes electronics 118 embedded in one or both of the rigid member 108 and the soft member 112. As will be disclosed herein, the electronics 118 may include components such as a power source and a wireless receiver. The wireless receiver may receive signals from an outside source, such as a transmitter controlled by a team coach or manager, or from a positioning system and provide an output signal that may be utilized to cause the haptic devices 102 to generate haptic stimulation. Unlike various examples of the shin guard 100 in which the haptic devices 102 are positioned so as to be either in contact with or in proximity of the skin of the wearer, the electronics 118 are, in the illustrated example, positioned with part of the soft member 112 between the wearer and the electronics 118 to reduce a likelihood of the electronics 118 coming into contact with the wearer.

FIG. 2 is a block diagram 200 of electronic components of the shin guard 100, in an example embodiment. The electronic components include the haptic devices 102 as well as the electronics 118, including a wireless receiver 202 and a power source 204. The wireless receiver 202 includes an antenna and electronics configured to receive wireless signals transmitted according to one or more wireless modalities, such as various Bluetooth modalities, 802.11-standard WiFi modalities, cellular modalities, and so forth. Based on the wireless signal as received, the haptic devices 102 turn on and generate a haptic signal detectable by a wearer of the shin guard 100.

While the block diagram 200 is not illustrated as including a controller or processor as a separate component, it is to be understood that a controller or processor may be included and/or that control functionality may be included as organic elements of various components, such as the haptic devices 102 and/or the wireless receiver 202. In various examples that will be disclosed in detail herein, a wireless signal as received by the wireless receiver 202 includes coded instructions for individual haptic devices 102 to selectively generate a haptic signal. The coded instructions may individually command individual haptic devices 102 to generate or not generate the haptic signal or may specify that individual haptic devices 102 generate haptic signals in predetermined patterns. Those predetermined patterns may be understood by the wearer of the shin guard 100 to correspond to instructions transmitted to the shin guard 100 and wearer.

Alternatively, the wireless signal may be in essence a binary signal that is treated by the haptic devices 102 as either commanding the haptic devices 102 jointly to either generate a haptic signal or not generate a haptic signal. Thus, for instance, the haptic devices 102 may include a simple comparator and, if the wireless signal is interpreted as a logical "1" by the haptic devices 102, then the haptic devices 102 output the haptic signal. If the wireless signal is interpreted as a logical "0" by the haptic devices 102, then the haptic devices 102 do not output the haptic signal. In such an example, the shin guard 100 may be understood to include no controller functionality or, to the extent that any aspect of the shin guard 100 is understood to include controller functionality, that functionality is a simple, binary comparison that does not allow for differentiation between and among haptic devices 102.

The power source 204 is or includes any mechanism that may be utilized to supply power to the haptic devices 102 and the electronics 118 generally. In various examples, the power source 204 is or includes a battery, super capacitor, and/or other energy storage device. The power source 204 optionally further includes electronics to provide desired voltage and current to particular components. Additionally or alternatively, as disclosed herein, the power source 204 may be or may include a kinetic energy generator, such as a piezoelectric generator, a photovoltaic cell or other solar generator, a thermoelectric generator, or any other suitable energy harvesting device or mechanism. The energy harvesting device may charge an energy storage device which may then supply energy to the haptic devices 102 and electronics 118 or may supply energy without first supplying an energy storage device.

Additionally or alternatively, the power source 204 may include the wireless receiver 202 and may harvest energy from the wireless receiver 202. In such an example, current induced in the antenna and/or other componentry of the wireless receiver 202 may be shunted off into an energy storage device and/or may be utilized directly, as with the energy harvesting devices described above. As such, harvesting energy from the wireless receiver 202 may be based on either signals intentionally transmitted to the wireless receiver 202, as disclosed herein, or from spurious wireless signals.

Further, the shin guard 100 may include wired or wireless interconnects for coupling the shin guard 100 to other articles, including an article of footwear, such as a cleat, or an article of apparel, such as pants, shorts, tights, and the like. The interconnects may be electrodes which are positioned on the shin guard such that when the wearer of the shin guard places an article of footwear on their foot the electrode on the shin guard automatically comes into contact with related electrodes on the article of footwear. Alternatively, the interconnect may be a "soft" interconnect utilizing wireless signals, such as near-field communication (NFC) or other short range wireless communication modalities. Upon the establishment of the interconnect, electronic functionality may be shared between the shin guard 100 and article as connected. Thus, for instance, the power source 204 may be included in the article of footwear but not in the shin guard 100, with power provided form the article of footwear. Additionally or alternatively, the power source 204 may provide power to the article of footwear, or the power source 204 and power source on the article of footwear may mutually share power. As such, any of the electronic functions of the shin guard 100 may be handled by the article and vice versa.

FIGS. 3A-3D, 4A, 4B, 5A, 5B, 6A, 6B, and 7A-7D illustrate various examples of predetermined patterns of haptic signals from haptic devices 102, in various example embodiments. The predetermined patterns are illustrated with respect to the four haptic devices 102 illustrated in FIG. 1. However, it is to be understood that the principles disclosed herein may be readily expanded to more haptic devices 102 that may be incorporated in a shin guard 100.

The figures in each series illustrate particular times in a sequence or pattern that are separated by a predetermined time, such as one-quarter to one-half second, or any suitable time as desired. The haptic devices 102 that are generating the haptic signal 300 may generate the haptic signal 300 continuously during the predetermined time or may deliver the haptic signal 300 during less than all of the predetermined time. In other words, the delivery of the haptic signal 300 may be continuous over the pattern or sequence or may be discontinuous while still adhering to the principles disclosed herein.

Figure 3A:
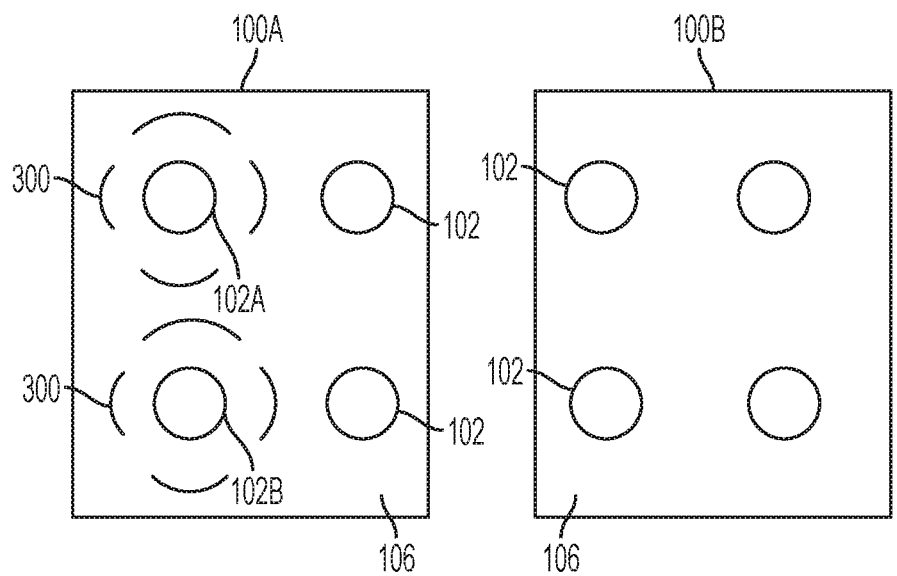
FIGS. 3A-3D illustrate the propagation of haptic signals from left-to-right across the haptic devices of two shin guards, in an example embodiment.
Figure 3B:
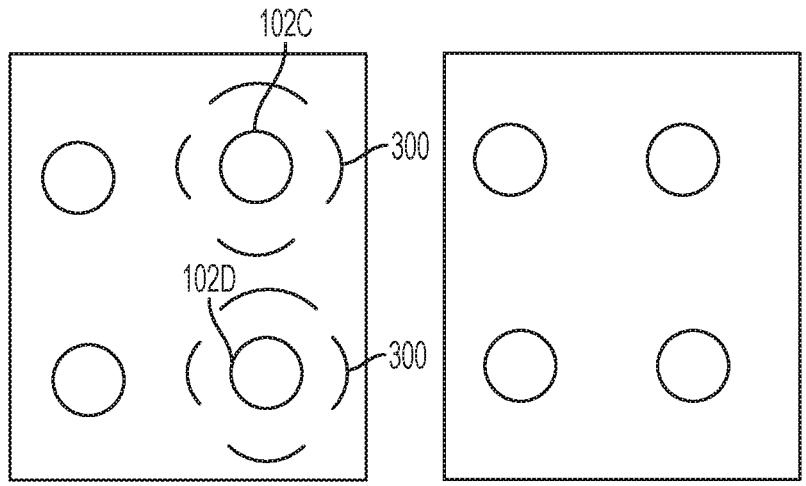
Figure 3C:
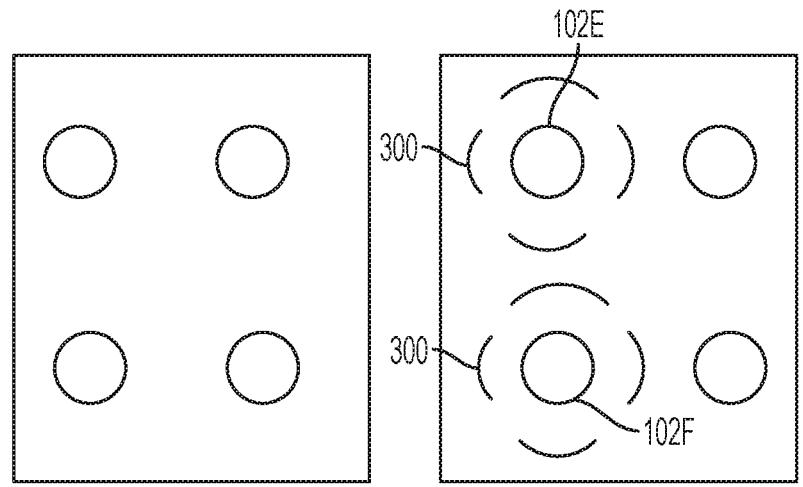
Figure 3D:
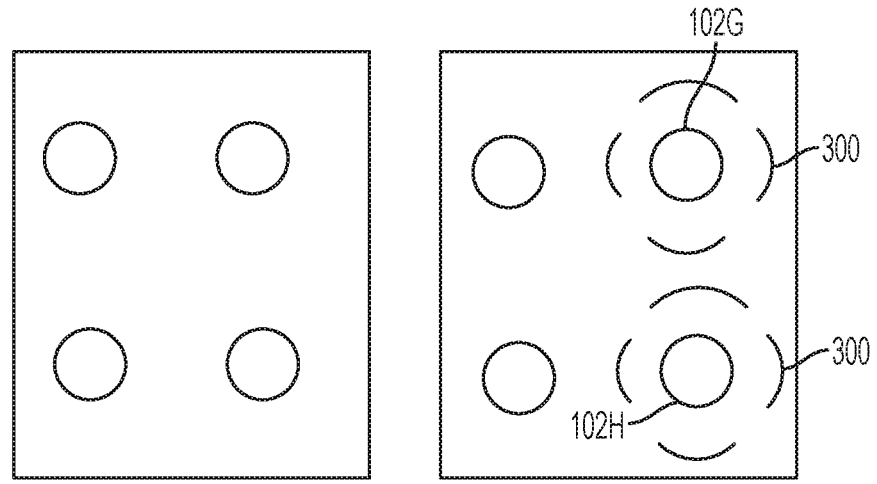

FIGS. 3A-3D illustrate the propagation of haptic signals 300 from left-to-right across the haptic devices 102 of two shin guards 100A, 100B, in an example embodiment. Thus, FIG. 3A illustrates the haptic signal generated at a first time of a pattern and FIG. 3D illustrates the haptic signal generated at a last time of a pattern, with FIGS. 3B and 3C illustrating times in between FIGS. 3A and 3D. The shin guard 100A is a shin guard intended to be worn on the left leg of a wearer and the shin guard 100B is a shin guard intended to be worn on the right left of a wearer. The perspective illustrated in these and the following drawings are of the inner surface 106 of the shin guards 100A, 100B. It is noted that while two shin guards 100A, 100B are illustrated, the principles disclosed in FIGS. 3A-3D may be implemented on just one shin guard 100, e.g., by performing only the operations of FIGS. 3A and 3B, or by performing the operations of FIGS. 3A and 3C concurrently and of FIGS. 3B and 3D concurrently.

In FIG. 3A, at a first time, the left-most haptic devices 102A, 102B each generate a haptic signal 300 while the remaining haptic devices 102 do not generate a haptic signal 300. In FIG. 3B, at a second time following the first time, the second left-most haptic devices 1020, 102D each generate a haptic signal 300 while the remaining haptic devices 102 do not generate a haptic signal 300. In FIG. 3C, at a third time following the second time, the second right-most haptic devices 102E, 102F each generate a haptic signal 300 while the remaining haptic devise 102 do not generate a haptic signal 300. In FIG. 3D, at a fourth, final time following the third time, the right-most haptic devices 102G, 102H each generate a haptic signal 300 while the remaining haptic devise 102 do not generate a haptic signal 300.

For the sake of simplicity, in the following illustrations only the haptic devices 102 of one shin guard 100 are illustrated from the perspective of the inner surface 106. However, it is to be recognized and understood that the principles disclosed herein with respect to one shin guard 100 may be implemented across both of the shin guards 100A, 100B that a wearer may tend to wear while participating in an event as illustrated above with respect to FIGS. 3A-3D. Alternatively, as noted above, the principles disclosed herein may be implemented only one shin guard 100 or may be implemented the same and concurrently on both shin guards 100.

Figure 4A:
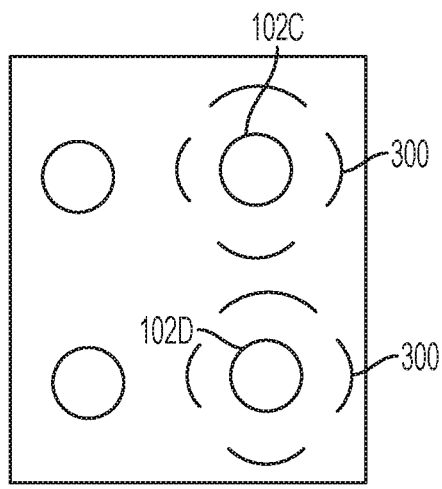
FIGS. 4A and 4B illustrate the right-to-left propagation of haptic signals across the haptic devices of a shin guard, in an example embodiment.
Figure 4B:
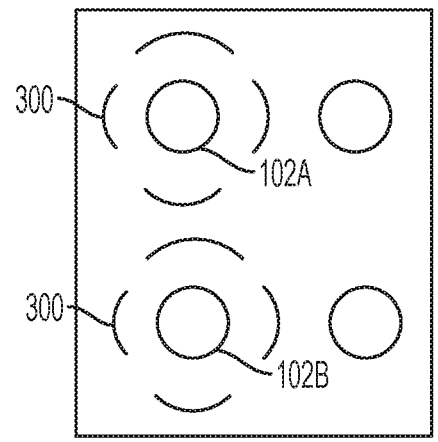

FIGS. 4A and 4B illustrate the right-to-left propagation of haptic signals 300 across the haptic devices 102 of a shin guard 100, in an example embodiment. In FIG. 4A, at a first time, the right-most haptic devices 102C, 102D each generate a haptic signal 300 while the remaining haptic devices 102A, 102B do not generate a haptic signal 300. In FIG. 4B, at a last, second time following the first time, the left-most haptic devices 102A, 102B each generate a haptic signal 300 while the remaining haptic devices 102C, 102D do not generate a haptic signal 300.

Figure 5A:
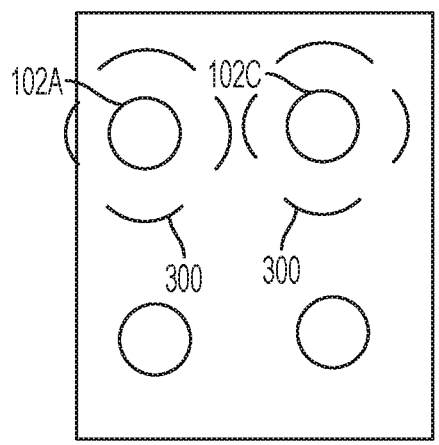
FIGS. 5A and 5B illustrate the upward propagation of haptic signals across the haptic devices of a shin guard, in an example embodiment.
Figure 5B:
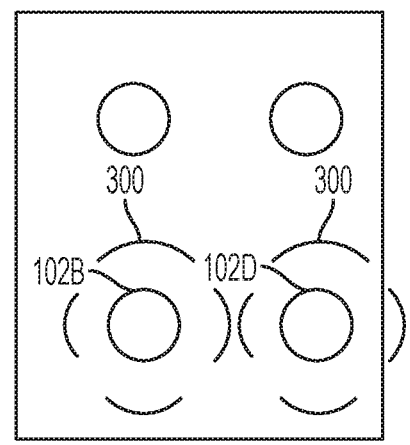

FIGS. 5A and 5B illustrate the upward propagation of haptic signals 300 across the haptic devices 102 of a shin guard 100, in an example embodiment. In FIG. 5A, at a first time, the bottom haptic devices 102B, 102D each generate a haptic signal 300 while the remaining haptic devices 102A, 102C do not generate a haptic signal 300. In FIG. 5B, at a last, second time following the first time, the top haptic devices 102A, 102C each generate a haptic signal 300 while the remaining haptic devices 102B, 102D do not generate a haptic signal 300.

Figure 6A:
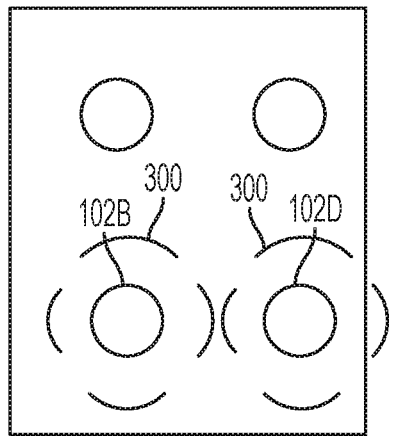
FIGS. 6A and 6B illustrate the downward propagation of haptic signals across the haptic devices of a shin guard, in an example embodiment.
Figure 6B:
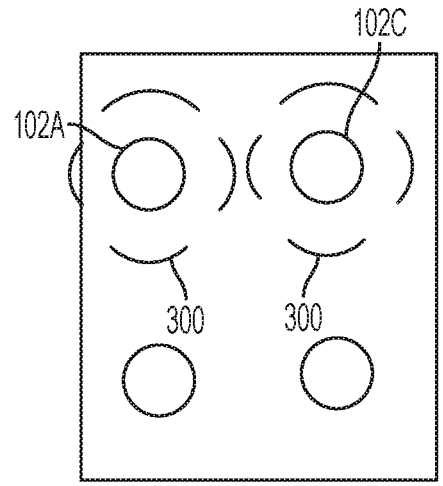

FIGS. 6A and 6B illustrate the downward propagation of haptic signals 300 across the haptic devices 102 of a shin guard 100, in an example embodiment. In FIG. 6A, at a first time, the top haptic devices 102A, 102C each generate a haptic signal 300 while the remaining haptic devices 102B, 102D do not generate a haptic signal 300. In FIG. 6B, at a last, second time following the first time, the bottom haptic devices 102B, 102D each generate a haptic signal 300 while the remaining haptic devices 102A, 102C do not generate a haptic signal 300.

Figure 7A:
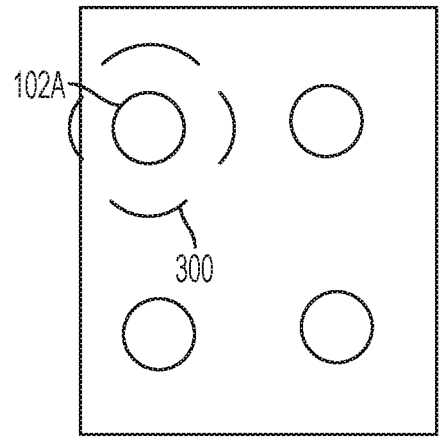
FIGS. 7A-7D illustrate the spiral propagation of haptic signals across the haptic devices of a shin guard, in an example embodiment.
Figure 7B:
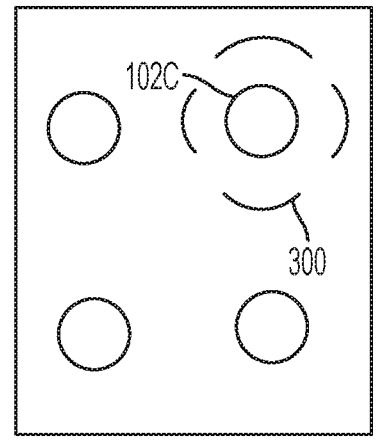
Figure 7C:
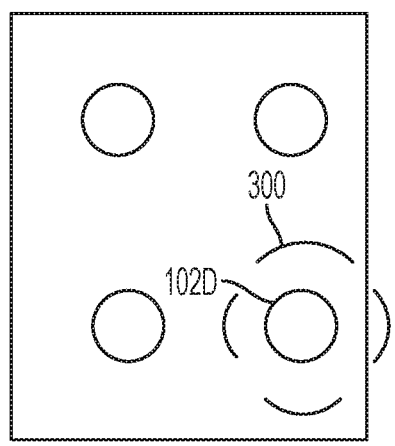
Figure 7D:
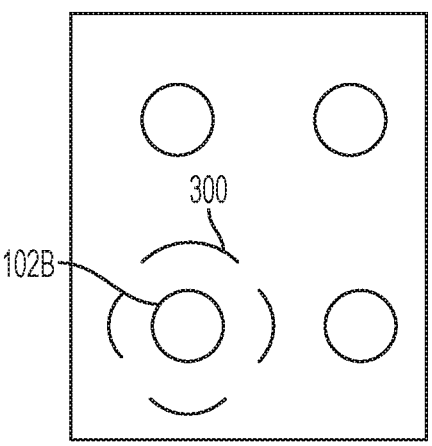

FIGS. 7A-7D illustrate the spiral propagation of haptic signals 300 across the haptic devices 102 of a shin guard 100, in an example embodiment. In FIG. 7A, at a first time, the top-left haptic device 102A generates a haptic signal 300 while the remaining haptic devices 102 do not generate a haptic signal 300. In FIG. 7B, at a second time following the first time, the top-right haptic device 102C generates a haptic signal 300 while the remaining haptic devices 102 do not generate a haptic signal 300. In FIG. 7C, at a third time following the second time, the bottom-right haptic device 102D generates a haptic signal 300 while the remaining haptic devices 102 do not generate a haptic signal 300. In FIG. 7D, at a final, fourth time following the first time, the bottom-left haptic device 102B generates a haptic signal 300 while the remaining haptic devices 102 do not generate a haptic signal 300.

The preceding examples are presented for illustration and not limitation and other patterns are contemplated, including "Z" patterns and the like. Patterns may repeat over time. Thus, the left-to-right pattern of FIGS. 3A-3D may be repeated by returning to FIG. 3A after completing FIG. 3D. In various examples, the pattern is repeated by effectively immediately returning to FIG. 3A, e.g., within the one-quarter to one-half second disclosed earlier, or following a pause of one or more seconds after the state in FIG. 3D.

Further, the patterns disclosed herein or that may be implemented according to the principles disclosed herein may vary the duration of the haptic signals 300 delivered in the various illustrated states. Thus, for instance, with respect to FIGS. 3A-3D, the haptic stimulation may be delivered for, e.g., one-half to one second in the state of FIG. 3A and one-quarter second in the states of FIGS. 3B-3D. Further, while a single haptic signal 300 is illustrated, it is to be understood that the haptic signal 300 itself may vary in intensity or other sensation discernable to the wearer. Thus, for instance, with respect to FIGS. 3A-3D, the haptic stimulation may be delivered at a higher intensity in FIG. 3A and at a lower intensity in the states of FIGS. 3B-3D. Variations in intensity may be arrived at by "throttling" or otherwise adjusting the throughput of the haptic devices 300 or, in examples in which one haptic device 102 includes multiple individual haptic motors or other elements, selectively turning on or off individual motors so as to adjust the intensity of the haptic signal 300.

Figure 8:
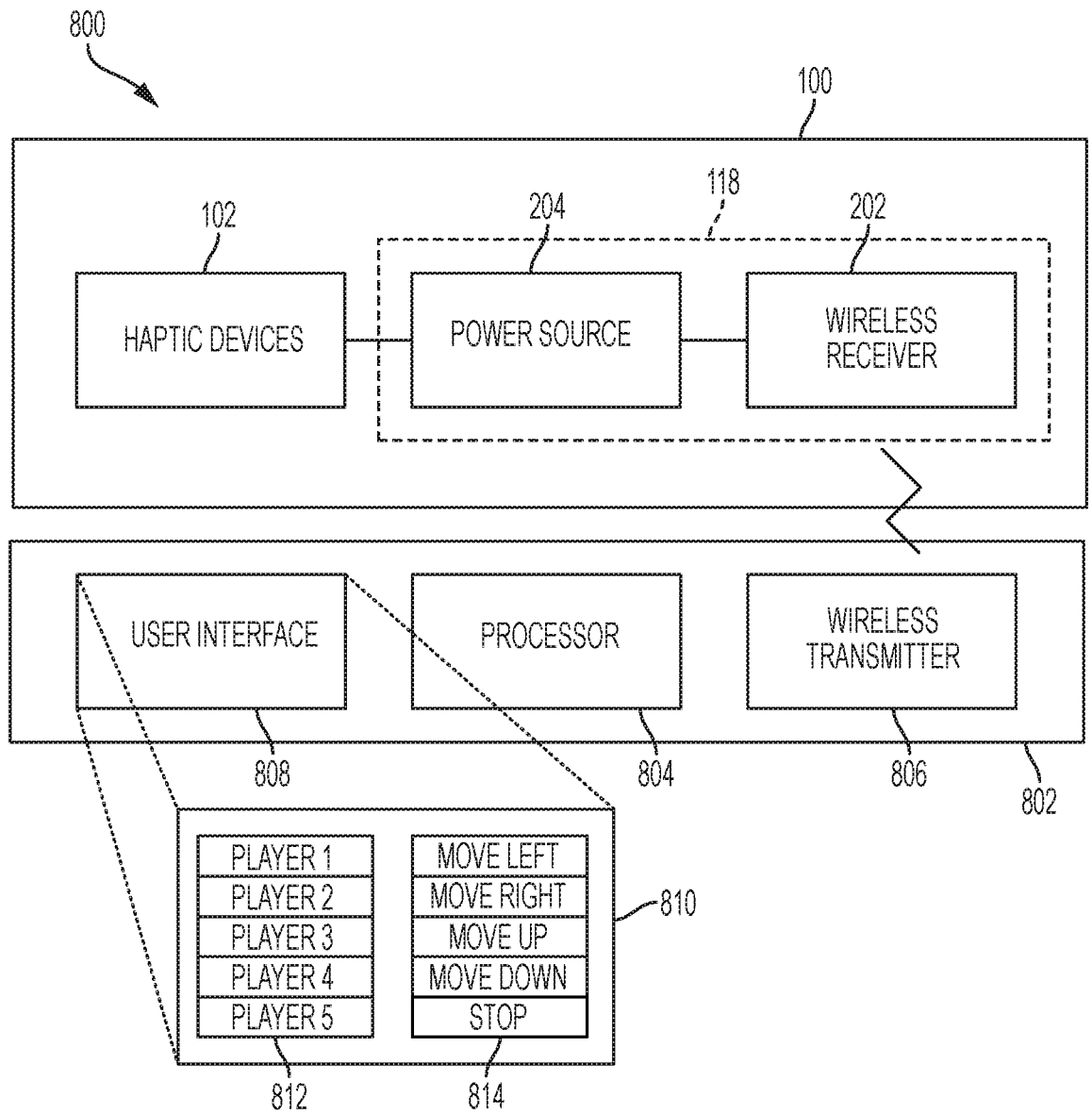
FIG. 8 is a block diagram of a system including the electronic components of the shin guard and components external to the shin guard, in an example embodiment.

FIG. 8 is a block diagram of a system 800 including the electronic components of the shin guard 100 and components external to the shin guard 100, in an example embodiment. The system 800 includes an external device 802 including a processor 804, a wireless transmitter 806, and a user interface 808. The external device 802 may be any of a variety of commercially available devices, including but not limited to a mobile device such as a tablet computer, smartphone, personal media device, such as an MP3 player and the like, a personal digital assistant (PDA), and so forth, or a personal computer or other similar devices, such as a laptop computer, desktop computer, workstation, and so forth. Additionally or alternatively, the external device 802 may be a custom device including at least the components disclosed herein. Further, while the external device 802 is described as a single device, it is to be recognized and understood that the external device 802 may alternatively be a system distributed across multiple platforms that variously include the components disclosed herein.

The processor 804 is configured to cause the user interface 808 to display information and receive commands that allows a user of the external device 802, such as a coach or manager of a sporting team, to issue commands or instructions to a wearer of the shin guard 100. In various examples, the commands or instructions are to change their position or activity or otherwise convey information according to a resultant pattern generated by the haptic devices 102 according to the command or instruction. The processor 804 causes the user interface 808 to display a screen 810 that include a player selection block 812 and multiple predetermined instructions 814. Upon the user selecting a particular player and a particular instruction, the processor 804 generates a command for transmittal to the wireless receiver 202 via the wireless transmitter 806. The command is coded to only be accepted by wireless receiver 202 corresponding to the shin guard 100 of the selected player. In various examples, the command is to implement a pattern of haptic signals 300 that corresponds to the command. Upon receipt of the wireless signal at the wireless receiver 204, the haptic devices 102 implement the pattern as disclosed herein.

In various examples, the commands uniquely pair one pattern with one instruction. Thus, for instance, the instruction to "MOVE RIGHT" corresponds to the left-to-right pattern illustrated in FIGS. 3A-3D, the instruction "MOVE LEFT" corresponds to the right-to-left pattern illustrated in FIGS. 4A and 4B, the instruction "MOVE UP" corresponds to the upward pattern illustrated in FIGS. 5A and 5B, and so forth. Thus, for instance, if the user selects the instruction to MOVE RIGHT, the processor 804 cross-references that to determine the left-to-right pattern should be transmitted as a command from the wireless transmitter 806 to the wireless receiver 204. Upon receipt of the command, the haptic devices 102 deliver the haptic signals 300 as illustrated in FIGS. 3A-3D.

Figure 9:
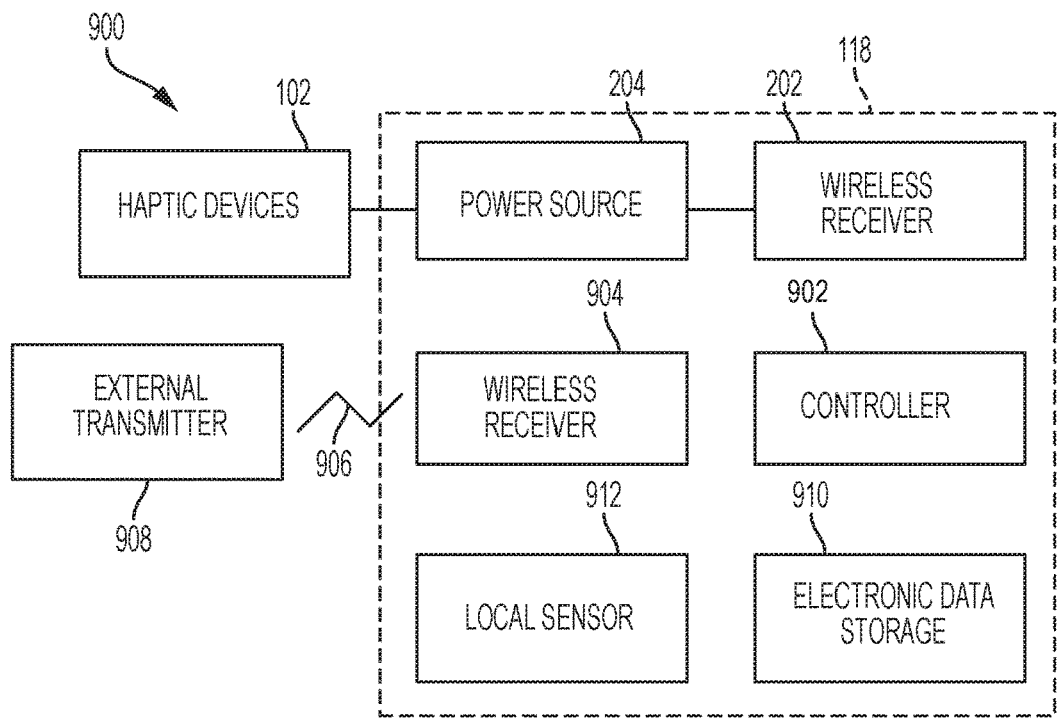
FIG. 9 is a block diagram of an alternative embodiment of electronics of a shin guard.

FIG. 9 is a block diagram 900 of an alternative embodiment of the electronics 118 of the shin guard 100. In contrast with the electronic components of the block diagram 200, in which the patterns of haptic signals 300 generated by the haptic devices 102 are generated on the basis of a command external to the shin guard 100, the block diagram 900 provides for automatic delivery of haptic signal 300 patterns. While the block diagram 900 may operate within the context of the system 800 and receive instructions entered by way of the user interface 808, the electrical components of the block diagram 900 may also utilize positional information or other information to identify variances in a specified location or activity in contrast to a requirement or baseline condition and cause the haptic devices 102 to deliver the haptic signal 300 according to specified patterns in a way that may be expected to correct the position or activity of the wearer.

In contrast to the electronics 118 of the block diagram 200, the electronics 118 of the block diagram 900 include a processor or controller 902 and a wireless receiver 904 that is configured to receive a positional signal 906 from one or more external transmitters 908 and, optionally, parameters within which the wearer is expected to be operating. On the basis of the positional signal 906, the controller 902 may determine a position of the shin guard 100 and, by extension, the wearer and cause the haptic devices 102 to implement a haptic signal pattern that may be intended to correct a position or activity of the wearer. The pattern may be delivered until the wearer has corrected the position or activity or has changed their position or activity to a second position or activity that the controller, based on the positional signal 906, determines requires a different pattern to correct. The In an example, the external transmitters 908 are transmitters on global positioning system (GPS) satellites or other geo-location or navigation system. In such an example, the controller 902 includes software to determine a position of the shin guard 100 according to GPS or other geo-location systems and technology known in the art. As such, in such an example the positional signal 906 relates to an absolute geographic location of the shin guard 100.

Additionally or alternatively, the external transmitters 908 are short range transmitters at known locations that emit signals that the wireless receiver 904 may utilize to triangulate the position of the shin guard 100 locally. Thus, in an example, three (3) or more external transmitters 908 are positioned in known locations around a playing field or arena in which a sporting event is being played. Based on the receipt of the positional signals 906, the shin guard 100 triangulates its position on the playing field, providing a local position of the shin guard 100, as disclosed further herein.

Alternatively, the wireless receiver 904 may be a wireless transceiver that is configured to emit electronic signals that may be detected by external wireless receivers or transceivers positioned in predetermined positions around the playing field or arena. On the basis of the signals transmitted from the wireless transceiver 904 and received by the external wireless receivers or transceivers, a processor external to the shin guard 100 may triangulate the positon of the shin guard 100 and transmit the positional signal 906 to the wireless transceiver 904 based on the position of the shin guard 100 as triangulated off of the signals from the wireless transceiver 904. The above examples are illustrative only, and it is emphasized that any positioning system known in the art or that may be developed may be utilized to generate the positional signal 100. Additionally, the positional signal 906 may be dispensed with altogether in examples in which the position of the shin guard 100 may be determined without the need for receiving a positional signal 906 from a source external to the shin guard 100.

The block diagram 900 further includes an electronic data storage 910 coupled to the controller 902. The electronic data storage 910 is configured to store data that corresponds to the generation of patterns of haptic signals 300 as disclosed herein. The electronic data storage 910 may further store positional parameters. Based on a comparison of the positional parameters to the location of the shin guard 100 based on the positional signal 906, the controller 902 may determine a pattern of haptic signals 300 that should be generated to induce the wearer to correct their position, as will be disclosed herein.

Figure 10:
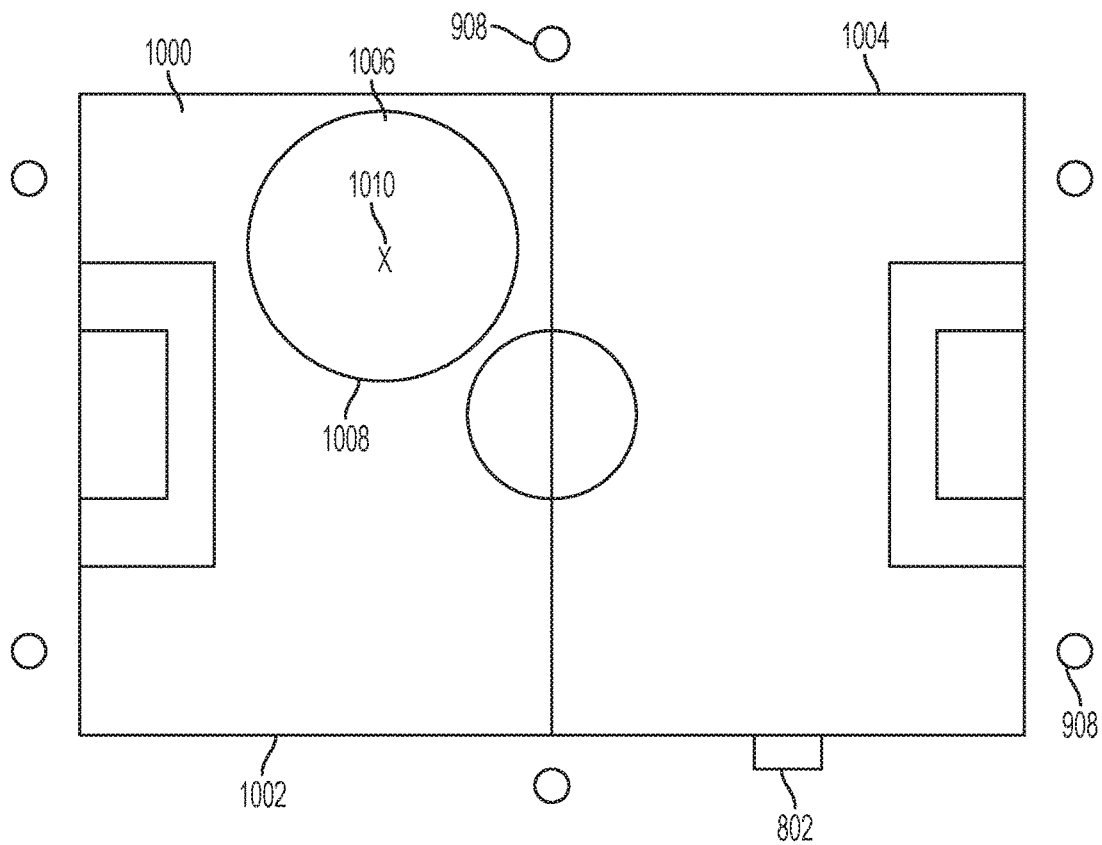
FIG. 10 is a diagram of a sporting field on which a shin guard may be utilized in performance of an activity, in an example embodiment.

In various optional examples, the block diagram 900 further includes one or more local sensors 912, such as an accelerometer, gyroscope, heat sensor, moisture sensor, sweat sensor, and so forth. A local sensor 912 may produce output that may be utilized by the controller 902 to determine, either alone or in conjunction with other local sensors or location information from the positional signal, a activity or attitude of the shin guard 100 and, by extension, that of the wearer. For instance, the accelerometer and gyroscope may generate outputs that the controller 902 may interpret as the wearer either running too hard or not fast enough. The controller 902 may cross-reference the accelerometer and gyroscope electronic data storage 910 for a pattern that is intended to cause the wearer of the shin guard 100 to variously slow down or speed up, e.g., a spiral pattern as illustrated in FIGS. 7A-7D. Similarly, the controller 902 may receive outputs from a sweat sensor and one or more other sensors, such as a temperature sensor, accelerometer, or gyroscope, and determine that the wearer has undesirably low sweating given an ambient temperature or activity level and generate a pattern intended to cause the wearer to take on fluids or reduce or cease major activity. The specific parameters of the local sensors 912 may be dependent on the FIG. 10 is a diagram of a sporting field 1000 on which the shin guard 100 may be utilized in performance of an activity, in an example embodiment. The sporting field 1000 as illustrated is a football pitch or soccer field, but it is to be understood that the principles disclosed herein may be readily applied to any of a variety of sporting or event areas, including American football fields, baseball fields, hockey rinks, and the like.

In the illustrated example, the external device 802 is positioned on a sideline 1002 in proximity of a coach or manager, though it is emphasized that the external device 802 may be positioned or utilized anywhere desired with respect to the field 1000, including remote to the field 1000 in circumstances where a network connection is available between the user interface 808 and the external transmitter 908. External transmitters 908 are optionally placed on sidelines 1002, ends 1004, and/or over the field 1000 to provide for local positioning as disclosed herein where local positioning is utilized in addition to or instead of geo-positioning systems, such as GPS.

The controller 902 accesses parameters, such as from the electronic data storage 910, according to which the wearer of the shin guard 100 is expected to operate while conducting an activity on the field 1000. In an example, the parameters establish a geographic zone 1006 in which the shin guard 100 (and by extension the wearer) should confine their activities. The zone 1006 may be static and substantially unchanging without intervention or may be variable dependent on a positon of another person or object, such as a ball, another player, a coach or manager, a remotely operated vehicle, such as a vehicle configured to fly over the field 1000, and so forth. In such examples, the external condition may be based on positional information emitted from the object or person, based on image recognition of the object or person, or based on any other suitable mechanism for identifying a position of the person or object. It is noted that while the controller 902 is described as controlling the automatic correction process described herein, it is to be understood that the function of the controller 902 may optionally be supplemented as appropriate by an external source, such as the processor 804, based on the availably of external sources. However, in various examples, the control of the delivery of haptic signals is wholly controlled by the controller 902 without need for external processing or controlling resources.

The zone 1006 is demarcated by any suitable mechanism, such as by defining particular edges 1008 and/or corners where applicable (e.g., the metes-and-bounds of the zone 1006) and/or by establishing an external reference point 1010 and a radial distance 1012 from the reference point 1010, among other suitable mechanisms. The controller 902 compares the position of the shin guard 100 as determined based on the positional signal 906 with the scope of the zone 1006 and, based on the comparison, delivers a pattern if the shin guard 100 and, by extension, the wearer, are outside of the zone 1006.

While the zone 1006 is described with particularity, it is to be recognized and understood that any of a variety of parameters may be utilized as the basis for delivering haptic signals 300. Thus, for instance, the controller 902 may access maximum or minimum desired speeds for the wearer and, to the extent that the positional signal 906 indicates that the wearer is running too fast or too slow the controller 902 may deliver a haptic signal pattern 300 that is interpretable to the wearer as an instruction to speed up or slow down. These examples are for illustration and not limitation, and it is to be readily understood that the patterns of haptic signals 300 that are delivered to the wearer may be utilized to communicate any instruction or information that may be desirably delivered to the player, including but not limited to an amount of time remaining in a game or match, notification of a substitution or player rotation, information about data from local sensors 912 (e.g., an indication that an amount of detected sweat has fallen below a threshold), and so forth.

As noted above, a location of the shin guard 100 on the field 1000 may be determined on the basis of various mechanisms, including via multi-modal wireless communications. The multi-modal communications may also allow for the shin guard 100 to operate as part of or otherwise control a body-area network of additional, peripheral devices. The mechanisms for utilizing multi-modal wireless communications are disclosed in detail herein.

The shin guard 100 may function within a broader wireless environment, including in the context of a multi-modal environment including body area networks and a wide area networks. The shin guard 100 may include or may be a player network hub and/or may be a peripheral device configured to communicate with a player network hub, among any other suitable implementation of the disclosure of co-pending application PCT/US2016/061431, "MULTI-MODAL ON-FIELD POSITION DETERMINATION", which is incorporated herein by reference in its entirety.

Figure 11:
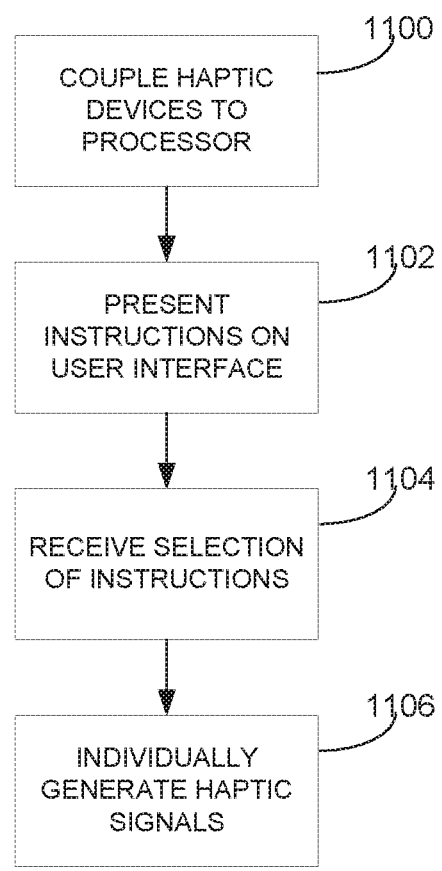
FIG. 11 is a flowchart for using a system including a shin guard with haptic devices, in an example embodiment.

FIG. 11 is a flowchart for using a system including a shin guard with haptic devices, in an example embodiment. The system may be the system 800 or any suitable system.

At 1100, haptic devices of a shin guard are communicatively coupled to a processor. The shin guard further includes a rigid member forming an outer surface of the shin guard and one or more soft members, secured with respect to the rigid member, forming an inner surface of the shin guard. The haptic devices are positioned with respect to one or both of the rigid member and the one or more soft members, the plurality of haptic devices configured to selectively generate haptic signals that may be sensed by a wearer of the shin guard. In an example, the communicatively coupling the processor with the haptic devices is by communicating wirelessly between a wireless receiver of the shin guard and a wireless transmitter operatively coupled to the processor.

At 1102, instructions are presented on a user interface operatively coupled to the processor to a user related to the wearer of the shin guard, individual ones of the predetermined patterns corresponding to instructions for the wearer of the shin guard.

At 1104, a selection of one of the instructions is received from the user interface.

At 1106, the haptic devices are cause to individually generate the haptic signals according to predetermined patterns. In an example, causing the haptic devices to deliver the haptic signals is according to one of the predetermined patterns corresponding to the one of the instructions as selected. In an example, causing the haptic devices to generate one of the predetermined patterns is based on a location of the wireless transmitter. In an example, the location of the wireless transmitter is relative to an external reference point. In an example, the location is based on a location on a sporting field.

Examples

In Example 1, a shin guard includes a rigid member forming an outer surface of the shin guard, one or more soft members, secured with respect to the rigid member, forming an inner surface of the shin guard, and haptic devices positioned with respect to one or both of the rigid member and the one or more soft members, the haptic devices configured to selectively generate haptic signals according to predetermined patterns that may be sensed by a wearer of the shin guard.

In Example 2, the shin guard of Example 1 optionally further includes that the haptic devices are embedded in the one or more soft members spaced apart from the inner surface.

In Example 3, the shin guard of any one or more of Examples 1 and 2 optionally further include that predetermined patterns comprises causing individual ones of the haptic devices to generate a haptic signal during predetermined times of a sequence of predetermined times.

In Example 4, the shin guard of any one or more of Examples 1-3 optionally further include that the predetermined patterns individually correspond to selectable instructions for the wearer of the shin guard.

In Example 5, the shin guard of any one or more of Examples 1-4 optionally further include a wireless receiver, operatively coupled to the haptic devices, configured to receive a signal and output an output signal configured to cause the haptic devices to generate the haptic signals according to a selected one of the predetermined patterns.

In Example 6, the shin guard of any one or more of Examples 1-5 optionally further include that the wireless receiver is configured to output the output signal based, at least in part, on a proximity to an external reference point.

In Example 7, the shin guard of any one or more of Examples 1-6 optionally further include that the wireless receiver is configured to output the output signal based, at least in part, on a command received from a processor via a wireless transmitted configured to communicate with the wireless receiver.

Example 8, a system includes a shin guard and a processor. The shin guard includes a rigid member forming an outer surface of the shin guard, one or more soft members, secured with respect to the rigid member, forming an inner surface of the shin guard, and haptic devices positioned with respect to one or both of the rigid member and the one or more soft members, the haptic devices configured to selectively generate haptic signals that may be sensed by a wearer of the shin guard. The processor is communicatively coupled to the haptic devices and configured to cause the haptic devices to individually generate the haptic signals according to predetermined patterns.

In Example 9, the system of Example 8 optionally further includes a wireless transmitter operatively coupled to the processor and configured to communicate wirelessly with the wireless receiver to communicatively couple the processor with the haptic devices.

In Example 10, the system of any one or more of Examples 8 and 9 optionally further includes that individual ones of the predetermined patterns correspond to instructions for the wearer of the shin guard and further comprises user interface, operatively coupled to the processor, configured to present instructions to a user related to the wearer of the shin guard and receive a selection of one of the instructions, wherein the processor is configured to cause the haptic devices to deliver the haptic signals according to one of the predetermined patterns corresponding to the one of the instructions as selected.

In Example 11, the system of any one or more of Examples 8-10 optionally further includes the wireless transmitter.

In Example the system of any one or more of Examples 8-11 optionally further includes that the processor is configured to cause the haptic devices to generate one of the predetermined patterns based on a location of the wireless transmitter.

In Example 13, the system of any one or more of Examples 8-12 optionally further includes that the location of the wireless transmitter is relative to an external reference point.

In Example 14, the system of any one or more of Examples 8-13 optionally further includes that the location is based on a location on a sporting field.

In Example 15, a method includes communicatively coupling haptic devices of a shin guard to a processor and causing, with the processor, the haptic devices to individually generate the haptic signals according to predetermined patterns. The shin guard includes a rigid member forming an outer surface of the shin and one or more soft members, secured with respect to the rigid member, forming an inner surface of the shin guard, wherein the haptic devices positioned with respect to one or both of the rigid member and the one or more soft members, the plurality of haptic devices configured to selectively generate haptic signals that may be sensed by a wearer of the shin guard.

In Example 16, the method of Example 15 optionally further includes communicating wirelessly between a wireless receiver of the shin guard and a wireless transmitter operatively coupled to the processor to communicatively couple the processor with the haptic devices.

In Example 17, the method of any one or more of Examples 15 and 16 optionally further includes that individual ones of the predetermined patterns correspond to instructions for the wearer of the shin guard and further includes presenting, on a user interface operatively coupled to the processor, instructions to a user related to the wearer of the shin guard and receiving a selection of one of the instructions, wherein causing the haptic devices to deliver the haptic signals is according to one of the predetermined patterns corresponding to the one of the instructions as selected.

In Example 18, the method of any one or more of Examples 15-17 optionally further includes that causing the haptic devices to generate one of the predetermined patterns is based on a location of the wireless transmitter.

In Example 19, the method of any one or more of Examples 15-18 optionally further includes that the location of the wireless transmitter is relative to an external reference point.

In Example 20, the method of any one or more of Examples 15-19 optionally further includes that the location is based on a location on a sporting field.

As used herein, the term "memory" refers to a machine-readable medium able to store data temporarily or permanently and may be taken to include, but not be limited to, random-access memory (RAM), read-only memory (ROM), buffer memory, flash memory, ferroelectric RAM (FRAM), and cache memory. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
   a shin guard, comprising:
   a rigid member forming an outer surface of the shin guard;
   one or more soft members, secured with respect to the rigid member, forming an inner surface of the shin guard; and
   haptic devices positioned with respect to one or both of the rigid member and the one or more soft members, the haptic devices configured to selectively generate haptic signals that may be sensed by a wearer of the shin guard;
   a processor, communicatively coupled to the haptic devices, configured to cause the haptic devices to individually generate the haptic signals according to predetermined patterns; and
   a wireless receiver operatively coupled to the haptic devices and configured to communicate wirelessly with a wireless transmitter operatively coupled to the processor to communicatively couple the processor with the haptic devices;
   wherein individual ones of the predetermined patterns correspond to instructions for the wearer of the shin guard and further comprising:
   a user interface, operatively coupled to the processor, configured to:
   present the instructions to a user related to the wearer of the shin guard; and
   receive a selection of one of the instructions, wherein the processor is configured to cause the haptic devices to deliver the haptic signals according to one of the predetermined patterns corresponding to the one of the instructions as selected.

2. The system of claim 1, wherein the processor is configured to cause the haptic devices to generate one of the predetermined patterns based on a location of the wireless transmitter.

3. The system of claim 2, wherein the location of the wireless transmitter is relative to an external reference point.

4. The system of claim 2, wherein the location is based on a location on a sporting field.

5. A method, comprising:
   communicatively coupling haptic devices of a shin guard to a processor, the shin guard further including:
   a rigid member forming an outer surface of the shin guard; and
   one or more soft members, secured with respect to the rigid member, forming an inner surface of the shin guard;
   wherein the haptic devices positioned with respect to one or both of the rigid member and the one or more soft members, the haptic devices configured to selectively generate haptic signals that may be sensed by a wearer of the shin guard;
   causing, with the processor, the haptic devices to individually generate the haptic signals according to predetermined patterns; and
   communicating wirelessly between a wireless receiver of the shin guard and a wireless transmitter operatively coupled to the processor to communicatively couple the processor with the haptic devices;
   wherein individual ones of the predetermined patterns correspond to instructions for the wearer of the shin guard and further comprising:

presenting, on a user interface operatively coupled to the processor, the instructions to a user related to the wearer of the shin guard; and receiving, with the user interface, a selection of one of the instructions;

wherein causing the haptic devices to deliver the haptic signals is according to one of the predetermined patterns corresponding to the one of the instructions as selected.

6. The method of claim 5, wherein causing the haptic devices to generate one of the predetermined patterns is based on a location of the wireless transmitter.

7. The method of claim 6, wherein the location of the wireless transmitter is relative to an external reference point.

8. The method of claim 6, wherein the location is based on a location on a sporting field.

\* \* \* \* \*